United States Patent
Wittwer et al.

(10) Patent No.: US 6,496,295 B1
(45) Date of Patent: Dec. 17, 2002

(54) GLAZING ELEMENT

(75) Inventors: Volker Wittwer, Freiburg (DE);
Andreas Georg, Freiburg (DE);
Wolfgang Graf, Eschbach (DE)

(73) Assignee: Fraunhofer Gesellschaft zur Forderung der angewandten Forschung e.V. (DE)

( * ) Notice: Subject to any disclaimer, the term of this patent is extended or adjusted under 35 U.S.C. 154(b) by 0 days.

(21) Appl. No.: 09/230,062

(22) PCT Filed: Aug. 6, 1997

(86) PCT No.: PCT/DE97/01651
§ 371 (c)(1),
(2), (4) Date: Jun. 18, 1999

(87) PCT Pub. No.: WO98/06000
PCT Pub. Date: Feb. 12, 1998

(30) Foreign Application Priority Data

Aug. 6, 1996 (DE) ............................................ 196 31 420

(51) Int. Cl.$^7$ ................................................ G02F 1/153
(52) U.S. Cl. ..................... 359/273; 359/274; 359/267; 359/265
(58) Field of Search ................................. 359/265–275

(56) References Cited

U.S. PATENT DOCUMENTS

| | | | | |
|---|---|---|---|---|
| 3,840,288 A | * | 10/1974 | Schnatterly | 359/274 |
| 4,439,302 A | * | 3/1984 | Wrighton et al. | 204/290.11 |
| 4,893,908 A | * | 1/1990 | Wolf et al. | 359/275 |
| 5,041,195 A | * | 8/1991 | Taylor et al. | 205/508 |
| 5,136,419 A | * | 8/1992 | Shabrang | 359/265 |
| 5,231,531 A | * | 7/1993 | Defendini et al. | 359/275 |
| 5,320,716 A | * | 6/1994 | Akhtar | 521/27 |
| 5,470,673 A | * | 11/1995 | Tseung et al. | 429/44 |
| 5,635,729 A | * | 6/1997 | Griessen et al. | 359/265 |
| 5,657,149 A | * | 8/1997 | Buffat et al. | 359/275 |
| 5,663,829 A | * | 9/1997 | Lefrou et al. | 359/275 |
| 5,864,994 A | * | 2/1999 | Graf et al. | 359/275 |
| 5,889,608 A | * | 3/1999 | Buffat et al. | 359/273 |
| 5,905,590 A | * | 5/1999 | Van Der Sluis et al. | 359/275 |

FOREIGN PATENT DOCUMENTS

| | | | |
|---|---|---|---|
| DE | 44 40 572 | * | 5/1996 |
| EP | 0 035 766 A | * | 9/1981 |
| WO | WO 91 14197 A | * | 9/1991 |
| WO | WO 92/16027 | * | 9/1992 |
| WO | WO 96/15348 | * | 5/1996 |

* cited by examiner

Primary Examiner—Evelyn A Lester
(74) Attorney, Agent, or Firm—St. Onge Steward Johnston & Reens LLC

(57) ABSTRACT

The present invention relates to a glazing element for facing building facades or window systems, in particular for motor vehicles, trains or aircraft, having at least two panes, which enclose an intermediate space, and on one pane surface facing said intermediate space a coating buildup is provided, having an electrically conductive layer applied to one pane surface, thereupon an electrochromic, and thereupon an ion-conducting and thereupon an electrocatalytic layer. The invention is distinguished by the fact that, in addition to the coating buildup in the intermediate space, which is free of water, solely a reducing or oxidizing gas or gas mixture comprising a reducing or an oxidizing gas or a gas mixture comprising a reducing or an oxidizing gas and an inert gas is provided and that an electric voltage of less than 1.2 volts between the electrically conductive and the electrocatalytic layer is applied.

12 Claims, 1 Drawing Sheet

GLAZING ELEMENT

TECHNICAL FIELD

The present invention relates to a glazing element, in particular for motor vehicles, trains or aircraft. The glazing element is provided with two panes which enclose an intermediate space. On at least one pane surface facing the intermediate space, a coating buildup is provided having applied thereupon an electrically conductive layer, thereupon an electrochromic layer, thereupon an ion-conductive layer and thereupon an electrocatalytic layer.

STATE OF THE ART

In many areas, such as for example in buildings, motor vehicles, aircraft or trains, an optically switchable glazing element able to regulate solar radiation is desirable. Optically switchable mirrors, switchable optical components or large-surface displays are further examples for use of optically switchable glazing elements.

A known buildup of an optically switchable component comprises a transparent electrode, an electrochromic layer, an ion conductor, a counter electrode as well as another transparent electrode layer. A buildup of this type is, for example, in the article by S. K. Deb in Solar Energy Materials and Solar Cells, 1992.

In order to improve the optical transparency of electrochromic components of this type, suggestions have been made to replace the counter electrode layer by optical materials such as for instance water. Thus since the 70s, a buildup called "Deb cell" has been known, in which the counter electrode is obviated by water that is located inside the ion-conducting layer which is separated by the applied voltage and with the thus formed $H^+$-ions the electrochromic layer is colored. For this see the article by S. K. Deb in Proc. $24^{th}$ Electronic Components Conf. (IEEE Washington 1974, pp. 11–14) as well as by C. B. Thomas, P. Lloyd, Microelectronics Vol. 7(3), pp. 29–43 (1976).

The layer buildup described in the abovementioned articles comprises a transparent electrode layer, an electrochromic layer, a water containing ion conductor layer and, as usual in systems of this type, a thin gold layer. The water separated by electrolytic action is subsequently supplied from the air via the gold layer. However, the water content inside the ion-conducting layer and the high electric voltages necessary for water separation lead to low stability of the overall electrochromic elements and very greatly limit its life-time. Thus, for example, there is a risk of chemical reactions inside the layers which can destroy the layer bonding. Moreover, the switching behavior of the known electrochromic elements is greatly dependent on humidity.

Another electrochromic arrangement is disclosed in DE 24 36 174 A1 and describes a layer arrangement, the purpose of which, in particular, is for use In solid state displays. This layer arrangement comprises a transparent electrode, which is applied to a transparent substrate. An, electrochromic layer is applied on the electrode layer on top which an ion-permeable insulator layer is provided. An electrocatalytic layer applied on the ion-permeable insulator layer serves as the counter electrode to the transparent electrode layer. A sponge structure provided on the electrocatalytic layer serves as the reservoir layer for atoms and/or molecules, which are electrolytically dissociated by the predominating potential conditions and the electrically charged ions migrate through the ion-permeable insulator layer into the eletrochromic layer respectively are driven out of it. This printed publication also proposes to introduce essentially water into the sponge structure which delivers $H^+$-ions following electrolytic separation. Consequently, with regard to this device, all the drawbacks previously discussed in connection with the "Deb cell" can be mentioned.

Finally U.S. Pat. No. 5,136,419 describes an electrochromic component which is provided with an intermediate space in which a gas mixture comprising inert gases and vapor of higher dielectricity constants, such as for instance a mixture of nitrogen and water vapor. This is particularly pointed out in column 1, lines 65 to 68 as well as column 4, lines 13 to 15. The highly dielectric material, preferably water, is ionized within an electric field. In this case, too, the known component is connected with all the previously discussed drawbacks that are inherent to a "Deb cell".

U.S. Pat. No. 4,505,538 also describes a type of improved Deb cell which is provided with a gas-filled intermediate space. In col. 5, lines 28 and 29, the printed publication mentions that there must be sufficient moisture in the gas-filled intermediate space so that a sufficient number of protons can be made available due to the moisture. This content and the examples listed in the printed publication indicate that a type of improved "Deb cell" is described which separates water by applying a voltage and injects the forming protons into the electrochromic layer.

DESCRIPTION OF THE INVENTION

The object of the present invention is to improve a glazing element for facing building facades or window systems, in particular for motor vehicles, trains or aircraft, having at least two panes which enclose an intermediate space and on at least one of the panes surfaces facing the intermediate space a coating system being provided having applied to one pane surface an electrically conductive, thereupon an electrochromic, thereupon an ion-conducting and thereupon an electrocatalytic layer applied in such a manner that the drawbacks connected with the use of water are obviated. In particular, the high control voltages to coloring and decoloring the electrochromic as possible layer are obviated. The glazing element should be designed optically transparent, i.e. should not possess any individual layers that subsequently influence the optical transmission properties.

The solution to the object on which the present invention is base is given in claim 1. Further features that advantageously develop the inventive ideas are the subject matter of the subclaims.

An element of the present invention is to design a glazing element for facing building facades or window systems, in particular for vehicles, trains or aircraft according to the generic part of claim 1 in such a manner that, in addition to the coating buildup in the intermediate space, which is free of water, is solely a reducing or oxidizing gas or a gas mixture comprising a reducing or oxidizing gas and an inert gas is provided and that an electric voltage of less than 1.2 volts is applied between the electrically conductive and the electrocatalytical layer.

The present invention is based on the idea of obviating all intermediate layers which impair the optical transmission properties of the invented glazing element. Instead of the sponge structure described in DE 24 36 174 A1, the present invention provides only a gas atmosphere which preferably comprises a mixture of a reducing gas, such as for instance hydrogen gas and an inert gas, such as for instance argon or nitrogen. An essential aspect of the present invention is that the electrochromic glazing element operates without the use of water. It was possible to demonstrate that the invented system can operate at voltages distinctly below the water separation voltage (1.2 V). In this manner the element can be operated at lower operating voltages so that the lifetime of the glazing element can be increased considerably.

The invented glazing element is provided with two panes which can be made of glass or plastic. On at least one pane surface, which faces the intermediate space between the two panes facing each other, a transparent, electrically conductive layer is applied on which, for its part, electrochromic material, such as for instance wolfram dioxide, molybdenum oxide, titanium oxide, vanadium oxide, chromium oxide, nickel oxide, cerium oxide, niobium oxide, yttrium oxide, or viologene is precipitated. Furthermore, an ion conductor, such as for instance made of aluminum oxide, silicon oxide, tantalum oxide, or a polymer electrolyte or an ion-conducting foil, is applied onto the electrochromic material layer. Finally an electrocatalytic layer is precipitated on the ion-conducting layer on which, if need be, another grid structure is applicable, which is made of an electrically conductive material and possesses transparent and hydrogen-permeable properties. The grid layer is, in particular, applied onto the electrocatalytic layer if, in the case of large-surface systems, the electric line of the electrocatalytic layer is dimensioned too small. As an alternative, an electrically conductive, transparent $H_2$ respectively H conducting layer can be applied e.g. even above respectively below the catalyst layer.

As previously mentioned, over this layer build up there is a gas atmosphere of a mixture of a reducing gas, such as for instance hydrogen gas and an inert gas, such as for instance argon or nitrogen. Small admixtures of oxygen gas, as may occur in the course of time due to small leaks, do not disturb the function of the element significantly. If too much hydrogen gas escapes or too much oxygen gas diffuses into the intermediate space between the two panes, the gas atmosphere can be replaced. It is especially important to note that the concentration of the hydrogen gas can be maintained distinctly below the explosion limit.

Another variant is the use of oxidizing gases respectively gas mixtures such as for instance air, in the case of anodic instead of cathodic electrochromic materials such as for instance $NiO_x$ instead of $WO_3$.

The manner of function of the invented glazing element is described below:

In the gas mixture introduced between the glass panes, the $H_2$-molecules are absorbed at the electrocatalytic layer and are catalytically dissociated and ionized at this layer. Oxygen molecules entering the intermediate oxygen molecules as a result of leaks are also dissociated and ionized by the catalytic action. If a voltage is applied to the electrically conductive layer, applied immediately to the pane surface, so that this layer becomes the cathode, the electric field caused by it draws $H^+$-ions via the ion conductor into the wolfram oxide layer Due to the opposite polarity of the $O^{2-}$-ions, these ions do not penetrate the layer sequence, in which the $H^+$-ions migrate due to the potential conditions. At the same time, electrons migrate from the transparently designed electrically conductive layer into the electochromic layer and color the same. The charge neutrality of the electrochromic layer remains ensured by the simultaneous entry of $H^+$-ions and electrons.

If the voltage is cut off, the electric field is maintained by the electrochemical potential of the electrochromic layer due to the coloring as is the coloring.

If however the electrically conductive layer becomes the anode, the HH+H-ions and the electrons are drawn off again from the electrochromic layer resulting in decoloring.

Thus by applying voltage between the electrically conductive, transparent layer on the pane and the electrocatalytic layer, the electrochromic layer can be colored and can be decolored again by pole reversal. Depending on the duration of the applied voltage, the coloring and decoloring is infinitely variable. If the voltage is cut off, the abovementioned color state is retained.

BRIEF DESCRIPTION OF DRAWINGS

The present invention is made more apparent by way of example in the following using a preferred embodiment with reference to the drawings, depicting in.

DESCRIPTION OF PREFERRED EMBODIMENTS

Figure 1:
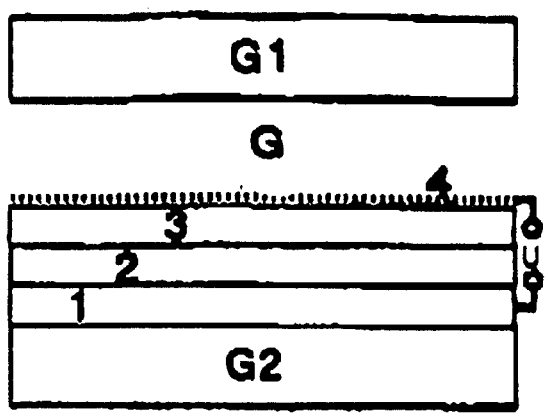
FIG. 1 a diagram of the layer buildup of a preferred embodiment of the present invention, FIGS. 2a,b a diagram of the transmission of the glazing element at different potential conditions.

The glazing element shown in FIG. 1 is provided with two glass panes G1 and G2 which face each other. A layer buildup is provided on the bottom glass pane G1. This layer buildup possesses the following individual layers: an electrically conductive, in particular, optically transparent layer 1, which serves as the electrode; an electrochromic layer 2, which preferably is made of wolfram oxide; an ion-conducting layer 3 onto which is applied an electrocatalytic layer 4. The electrocatalytic layer 4 serves as a counter electrode to the electrically conductive layer 1. A gas mixture G which preferably contains hydrogen gas is introduced between the electrocatalytic layer 4 and the glass pane G1 so that $H_2$ molecules are formed by absorption at the electrocatalytic layer 4. Due to the predominating potentials at the electrode layers 1 and 4, the hydrogen gas parts dissociate and ionize and migrate in the event of a negative potential to the electrode layer 1 into the electrochromic layer 2. Simultaneous, subsequent electron migration from the cathode 1 into the electrochromic layer 2 cause the coloring of this layer and simultaneously contribute in combination with the $H^+$-ions present to charge neutrality in this layer.

This coloring process can also be reversed by changing the potential at the electrically conductive layer 1.

Figure 2A:
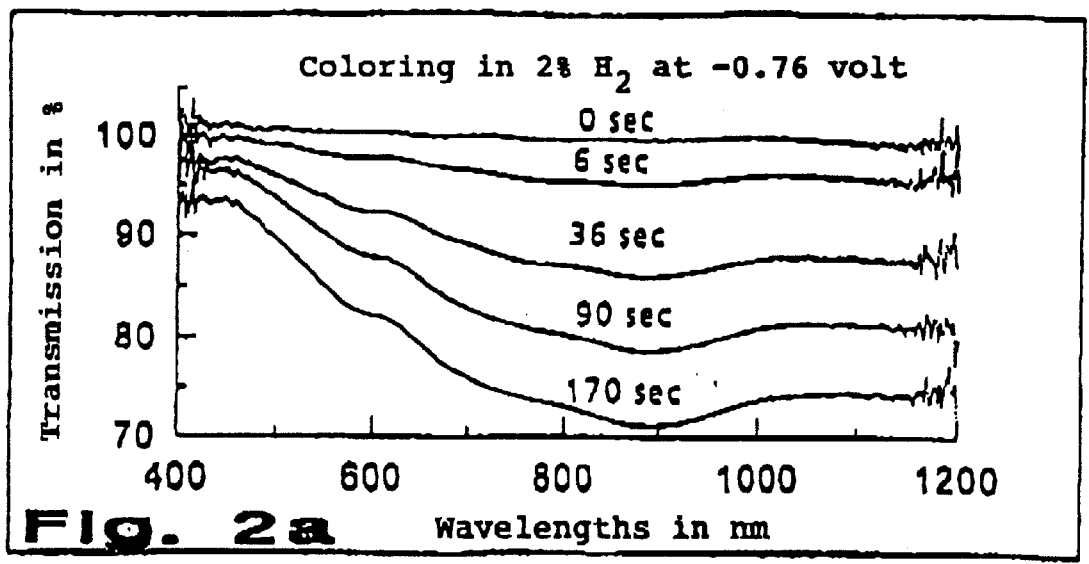
Figure 2B:
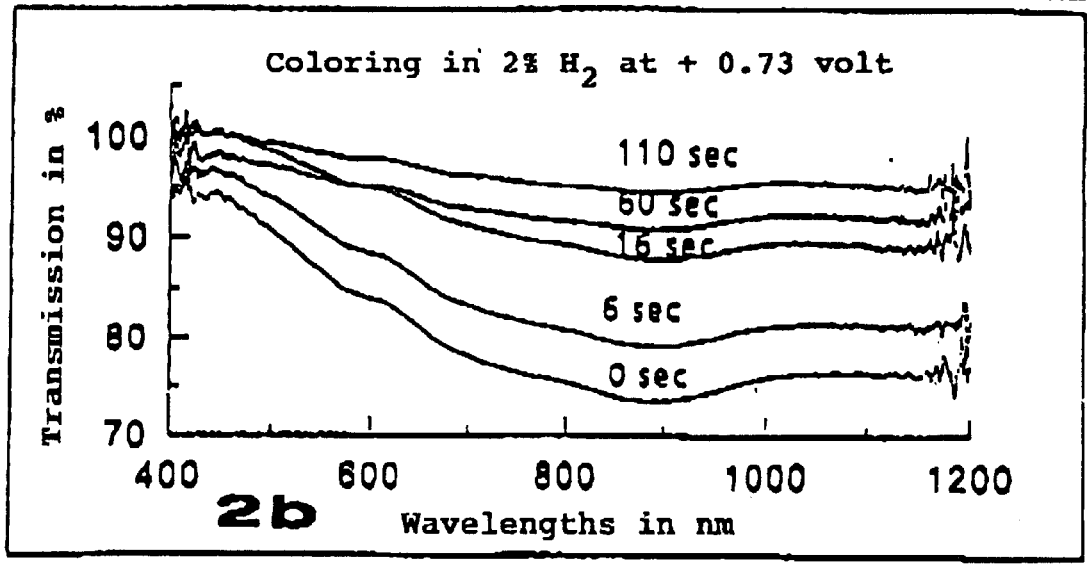

FIGS. 2a and 2b show the transmission in per cent through an invented glazing element according to FIG. 1 in the coloring process (see FIG. 2a) and in the decoloring process (for this see FIG. 2b). Wolfram oxide was precipitated as the electrochromic material, tantalum oxide as ion conductor and platinum as catalytic layer.

The measured and shown 100 per cent transmission values relate to the uncolored state. The time-coloring behavior of a glazing element to whose electrically conductive layer 1 a voltage of −0.76 volt is applied can be seen in the diagram according to FIG. 2a.

The gas atmosphere has a two percent hydrogen gas part. The transmission curves indicating the transmission values in a wavelength range between 400 and 1200 nm shown together are determined chronologically. The top transmission line occurs at the time point 0, when there is no potential drop between the electrode layers 1 and 4. Using the transmission curves ascertained after 6,36 90 and 170 seconds after application of the negative potential at the electrode 1 shown together, the temporal course of the spectral coloring of the glazing element can be determined. The same applies to FIG. 2b in which the decoloting process in different time intervals after application of a positive voltage at the electrode layer 1 can be seen.

The layer buildup of the glazing element can be obtained using different coating methods, such as for instance-sputtering, CVD or sol-gel process. Also suited are DC magnetron sputtered wolfram oxide layers.

Fundamentally, the glazing element is also to be further developed as a switchable mirror, whose layer buildup is to be modified to such a degree that onto the substrate respectively onto a pane, which no longer needs to be designed transparent, an electrically conductive layer, which is reflecting, is applied. If the pane is already designed electrically self-conductive and reflecting, this layer can be obviated. In order to reduce reflection in the previously mentioned layer buildup, a negative voltage is to be applied to the electrically conductive layer which preferably is disposed below the electrochromic layer.

It should be understood that gas or the gas mixture in the glazing element may optionally be capable of being interchanged with other gases of gas mixtures. Moreover, the glazing element may further include a low-e layer to reflect the infrared range but remain permeable in the visible range for reduction of the k-value. The low-e layer may further be of a silver or semiconductor material.

What is claimed is:

1. A glazing element, comprising:
    a first pane;
    a second pane spaced apart from said first pane and having a surface facing said first pane;
    an electrically conductive layer between said surface and said first pane, said electro-conductive layer being in contact with said surface for acting as an electrode;
    an electrochromic layer between said electrically conductive layer and said first pane, said electrochroic layer being in contact with said electrically conductive layer;
    an ion conducting layer between said electrochromic layer and said first pane, said ion conducting layer being in contact with said electrochromic layer;
    an electrocatalytic layer between said ion conducting layer and said first pane, said electrocatalytic layer being in contact with said ion conducting layer for acting as a counter electrode to provide an electrical connecting with said electrically conductive layer;
    a gas mixture between said electrocatalytic layer and said first pane for permitting operation of the glazing element at a reduced voltage; and
    a reducing gas component placed between said first and second panes that adsorb and dissociate at said electrocatalytic layer.

2. The glazing element according to claim 1, further comprising an electrically conducting material in between said first pane and said electrocatalytic layer, said electrically conducting material being in contact with said electrocatalytic layer for providing an electrical connection.

3. The glazing element according to claim 1, wherein said gas mixture is selected from the group consisting of a reducing gas, an oxidizing bas, an inert gas, and mixtures thereof.

4. The glazing element according to claim 1, further comprising an electric voltage of less than 1.2 volts being applied between said electrically conductive and said electrocatalytic layers.

5. The glazing element according to claim 1, wherein said ion conducting layer is selected from the group consisting of aluminum oxide, silicon oxide, tantalum oxide, polymers, and combinations thereof.

6. A glazing element according to claim 1, wherein an electric voltage between the electrically conductive layer applied to the pane surface and the electrocatalytic layer is variable.

7. A glazing element according to claim 1, wherein the ion-conducting layer contains tantalum oxide, or aluminum oxide, or silicon oxide, or a polymer electrolyte or an ion-conducting foil.

8. A glazing element according to claim 1, wherein the ion-conducting layer contains electrically poor conducting tungsten oxide, or molybdenum oxide, or titanium oxide, or vanadium oxide, or cerium oxide.

9. A glazing element according to claim 1, wherein the gas or the gas mixture inside the Intermediate space is replaceable.

10. A glazing element according to claim 1, wherein for increasing transmission of the electrochromic layer, a positive voltage is applicable to the electrically conductive layer which is applied directly onto the pane surface.

11. A glazing element according to claim 1, wherein the electrochromic layer contains tungsten oxide, or molybdenum oxide, or titanium oxide, or vanadium oxide, or chromium oxide, or cerium oxide, or nickel oxide, or niobium oxide, or yttrium oxide, or a viologene or a polyaniline.

12. A glazing element, comprising:
    a first pane;
    a second pane spaced apart from said first pane and having a surface facing said first pane;
    an electrically conductive layer between said surface and said first pane, said electro-conductive layer being in contact with said surface for acting as an electrode;
    an electrochromic layer between said electrically conductive layer and said first pane, said electochromic layer being in contact with said electrically conductive layer;
    an ion conducting layer between said electrochromic layer and said first pane, said ion conducting layer being in contact with said electrochromic layer;
    an electrocatalytic layer between said ion conducting layer and said first pane, said electrocatalytic layer being in contact with said ion conducting layer for acting as a counter electrode to provide an electrical connecting with said electrically conductive layer;
    a gas mixture between said electrocatalytic layer and said first pane for permitting operation of the glazing element at a reduced voltage; and
    an electrically conductive grid structure or a transparent, electrically conductive hydrogen-permeable material is applied onto said electrocatalytic layer.

* * * * *